United States Patent [19]

Tanaka et al.

[11] Patent Number: 4,851,870
[45] Date of Patent: Jul. 25, 1989

[54] SHUTTER APPARATUS FOR CAMERA

[75] Inventors: Yoshihiro Tanaka; Tetsuya Uno; Sadafusa Tsuji; Hiroshi Ootsuka; Shinichi Yokoyama; Takeshi Hashimoto; Michihiro Iwata, all of Osaka, Japan

[73] Assignee: Minolta Camera Kabushiki Kaisha, Osaka, Japan

[21] Appl. No.: 184,092

[22] Filed: Apr. 20, 1988

[30] Foreign Application Priority Data

Apr. 21, 1987 [JP]  Japan .................................. 62-98047

[51] Int. Cl.$^4$ ................................................ G03B 9/14
[52] U.S. Cl. .................................. 354/234.1; 354/265; 354/457
[58] Field of Search ....................... 354/226, 234.1, 250, 354/265, 457

[56] References Cited

U.S. PATENT DOCUMENTS

| | | | |
|---|---|---|---|
| 3,110,824 | 11/1963 | Flanagan ........................ | 354/234.1 X |
| 3,518,930 | 7/1970 | Thieme et al. ................. | 95/64 |
| 4,119,979 | 10/1978 | Frank et al. .................... | 354/234.1 X |
| 4,198,140 | 4/1980 | Frank et al. .................... | 354/234.1 X |
| 4,234,245 | 11/1980 | Toda et al. ..................... | 354/234.1 X |
| 4,291,958 | 9/1981 | Frank et al. .................... | 354/195.1 X |
| 4,426,145 | 1/1984 | Hashimoto ...................... | 354/234.1 X |
| 4,609,275 | 9/1986 | Ishiguro ......................... | 354/435 |
| 4,786,930 | 11/1988 | Suzuki et al. ................... | 354/234.1 |
| 4,791,442 | 12/1988 | Touma et al. ................... | 354/234.1 |

FOREIGN PATENT DOCUMENTS

61-295535 12/1986 Japan .

Primary Examiner—Michael L. Gellner
Attorney, Agent, or Firm—Burns, Doane, Swecker & Mathis

[57] ABSTRACT

The disclosure relates a piezoelectric element-drive type shutter apparatus for camera. The shutter apparatus includes a main piezoelectric element having a free end which is able to move between a closed position and an opening position to drive shutter blades so as to be opened and closed, and an auxiliary piezoelectric element having a free end for urging the shutter blades toward its closed position when the free end of the main piezoelectric element returns from the opening position to the closed position. When the main piezoelectric element returns to the closed position, i.e. an initial position, the auxiliary piezoelectric element assists the returning movement of the main piezoelectric element. Accordingly, the shutter blades can be closed at a very high speed. This is very effective particularly when a small aperture of the shutter blade is desired. Furthermore, since the returning movement of the main piezoelectric element includes a compulsory force of the auxiliary element as well as a returning force of itself, the returning movement of the main piezoelectric element is insured to be stable as well as speedy, so that very accurate exposure can be obtained.

18 Claims, 9 Drawing Sheets

Fig. 8  PRIOR ART

SHUTTER APPARATUS FOR CAMERA

BACKGROUND OF THE INVENTION

1. Field of the Invention

The present invention generally relates to a shutter apparatus for camera, and particularly relates to a shutter apparatus for camera of a type in which piezoelectric element is employed as driving means for opening and closing the shutter blades.

2. Description of the Prior Art

Conventionally, the shutter apparatus of the above type includes a single driving lever for opening and closing the shutter blades, which lever consists of a piezoelectric element. One end of the lever is supported by a support means provided in a camera, on one hand, while the other end, i.e. the free end, can be curved or moved in the opposite directions to drive the shutter blades.

Incidentally, the shutter apparatus of a camera, generally, requires that the shutter blades can be closed momentarily after the passage of a predetermined exposure time. In addition, the time period to be consumed for closing the shutter blades should be as shorter as possible.

Figure 8:
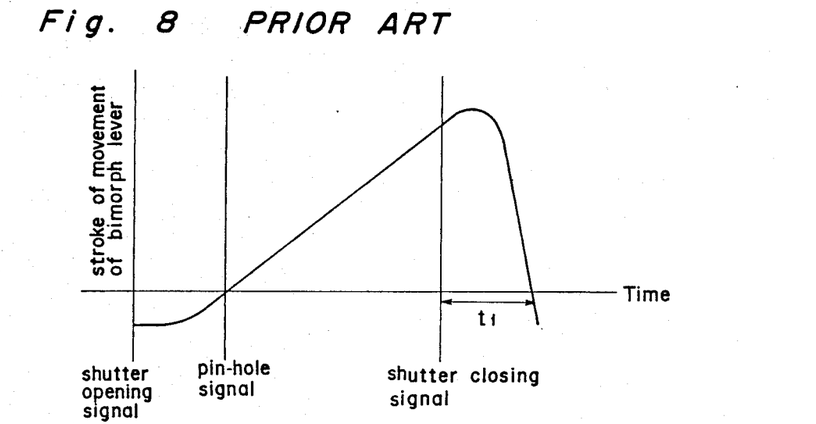
FIG. 8 is a graph showing a voltage-movement of the piezoelectric element according to the prior art, as previously described.

It should be noted that the conventional shutter apparatus has such a shutter characteristic as shown in FIG. 8. The shutter characteristic is defined by a voltage-movement characteristic of the piezoelectric element which is shown in FIG. 8. In FIG. 8, the abscissa axis represents the time, while the ordinate axis represents the stroke or amount of movement of the element, and the solid curved line represents a wave-form of movement of the element. As apparent from FIG. 8, since the element carries the inertial system, i.e. the shutter blades and etc., delay of response to the shutter closing signal occurs, resulting in that a long time period t1 is consumed for fully closing the shutter blades. As previously described, the time period t1 should be as shorter as possible. If the time period t1 is quite long, the high speed shutter apparatus can not be obtained.

SUMMARY OF THE INVENTION

Accordingly, an essential object of the present invention is to provide a shutter apparatus in which the returning movement of a piezoelectric driving means for driving the shutter blade is faster so that the shutter blade an be closed more rapidly.

In accomplishing these and other objects, there is provided a shutter apparatus for camera, which comprises a main piezoelectric driving means having an operating portion which is able to move between a closed position and an opening position to drive a shutter blade so as to be opened and closed, and an auxiliary piezoelectric driving means having an operating portion for urging the shutter blade toward its closed position when the operating portion of the main piezoelectric driving means returns from the opening position to the closed position.

The operating portion of the auxiliary piezoelectric driving means can act directly on the shutter blade to move toward their closed positions. However, it is preferable that the operating portion of the auxiliary piezoelectric driving means acts on the end of the main piezoelectric driving means to move the shutter blade toward their closed position. According to the latter, the construction of the driving mechanism can be much simplified.

With the construction as described above, when the main piezoelectric driving means piezoelectric driving means returns to the closed position, i.e. an initial position, the auxiliary piezoelectric driving means assist the returning movement of the main piezoelectric driving means. Accordingly, the shutter blade can be closed at a very high speed. This is very effective particularly when a small aperture size is desired. Furthermore, since the returning movement of the main piezoelectric driving means includes a compulsory force of the auxiliary driving means as well as a returning force of itself, the returning movement of the main piezoelectric driving means is insured to be stable as well as speedy, so that very accurate exposure can be obtained.

BRIEF DESCRIPTION OF THE DRAWINGS

These and other objects and feature of the present invention will become apparent from the following description taken in conjunction with the preferred embodiments thereof with reference to the accompanying drawings, in which:

FIGS. 6c 6d are, respectively, time charts for desired operations of the control circuit shown in FIG. 6a;

DETAILED DESCRIPTION OF THE INVENTION

Before the description of the present invention proceeds, it is to be noted that like parts are designated by like reference numerals and symbols throughout the several views of the accompanying drawings.

Figure 1:
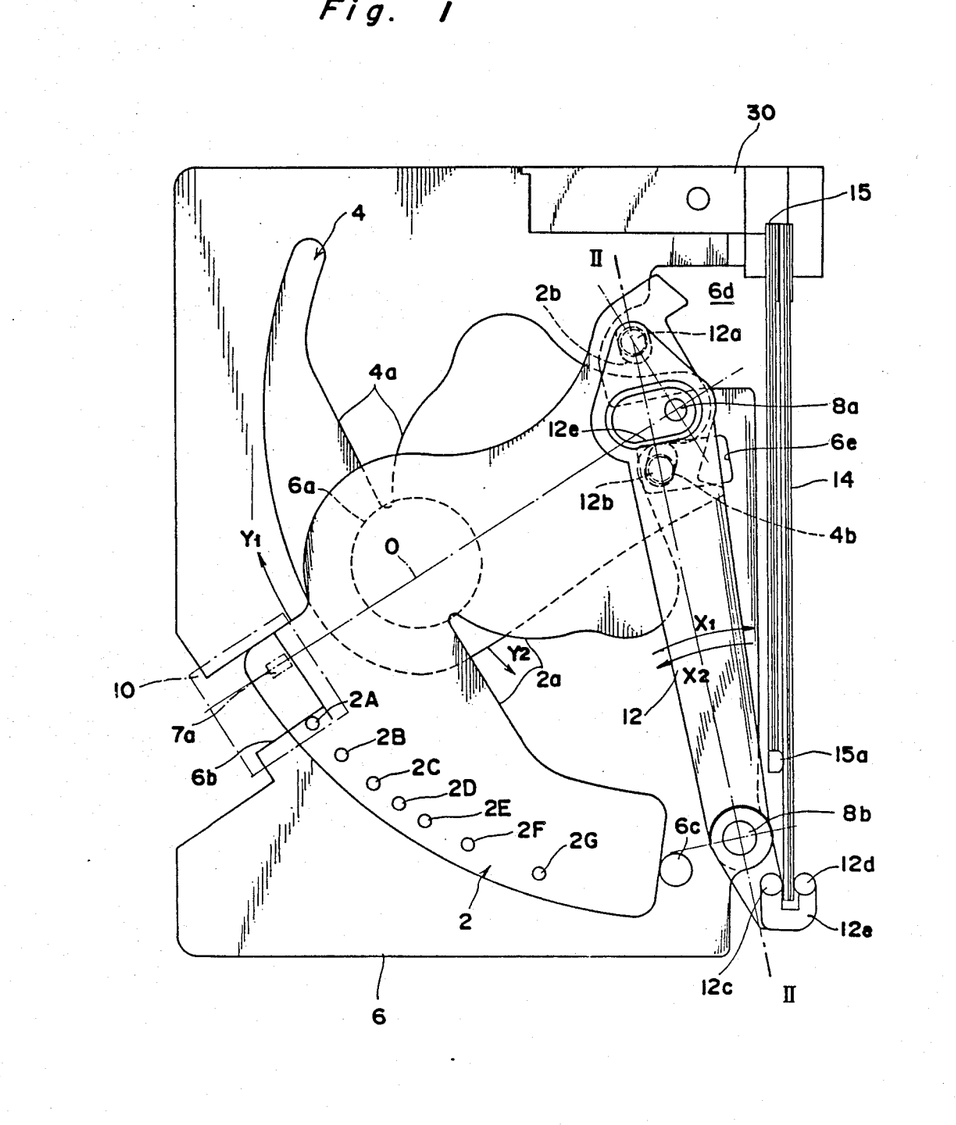
FIG. 1 is a front view showing an essential part of a shutter apparatus according to a preferred embodiment of the present invention.
Figures 2, 3, 4:
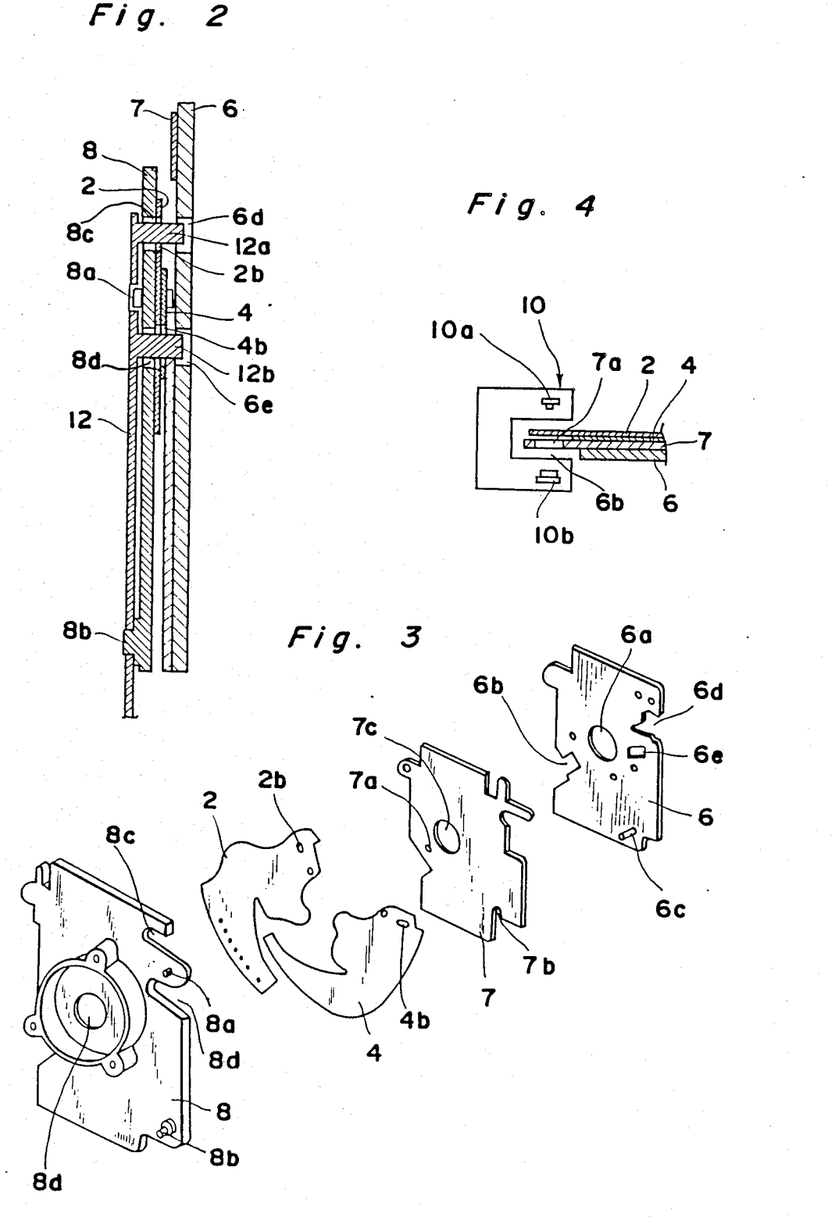
FIG. 2 is a section taken along a line II—II in FIG. 1.
FIG. 3 is an exploded perspective view showing the shutter apparatus.
FIG. 4 is a section showing a manner in which an photoelectric sensor is incorporated in the shutter apparatus.

Referring to FIGS. 1, 2 and 3, which respectively show general configuration of a shutter apparatus, the shutter apparatus comprises a main piezoelectric element 14 and a pair of shutter blades 2 and 4 which are respectively driven by the main piezoelectric element 14 to open and close an aperture. One shutter blade 2 has, at its predetermined position, a plurality of shutter-opening detecting holes 2A, 2B, 2C, 2D, 2E, 2F and 2G. When the shutter blade 2 is moved to open the aperture, the passage of the shutter-opening detecting holes 2A–2F are detected by an photoelectric sensor 10 which is located at a predetermined fixed position, resulting in that an amount of the aperture opening can be detected. When the predetermined amount of opening has been obtained, the piezoelectric element 14 returns to the initial position as shown in FIG. 1 to close the aperture by the shutter blades 2 and 4.

The detailed description of the each components and their function will be made below. It is to be noted that a front plate 8 and an intermediate plate 7 are omitted in FIG. 1.

The shutter apparatus has, in turn from the front, said front plate 8, an intermediate plate 7 and a support plate 6. A pin 8a is mounted on the front plate 8 to penetrate therethrough. The pair of shutter blades 2 and 4 are pivotally supported by the pin 8a behind the front plate 8. The shutter blades 2 and 4 are substantially symmetrically arranged with respect to an imaginary line O passing a point adjacent to the center of an exposure-opening 6a of the support plate 6 and the center of the pin 8a in FIG. 1. The shutter blades 2 and 4 are located in a space between the front plate 8 and the intermediate plate 7. As apparent from FIG. 1, one end of the shutter blades 2 is in contact with a pin 6c provided on the support plate 6 so that the closing positions of the shutter blades 2 and 4 is fixed. The pin 6c extend forwardly from the support plate 6 to penetrate a recess 7b of the intermediate plate 7.

The photoelectric sensor 10 is arranged around a recess 6b of the support plate 6, and, as shown in FIG. 4, has a light emitting element 10a and a light receiving element 10b which are arranged so as to sandwich the support plate 6, intermediate plate 7 and shutter blades 2 and 4. The optical passage of the photoelectric sensor 10 passes through a hole 7a of the intermediate plate 7. The shutter-opening detecting holes 2A–2G cross, in turn, the optical passage when the shutter blade 2 is rotated around the pin 8a.

The support plate 6 is, preferably, made of metal, supports the shutter apparatus and the taking lenses (not shown) and is mounted to the camera body. The support plate 6 has a plurality of holes for fixture. Accordingly, if the intermediate plate 7 is omitted, the shutter blades would be engaged with said holes for fixture to cause a trouble as to the movement of the shutter blades. The intermediate plate 7 has a smooth front surface facing the shutter blades so that the shutter blades is insured to move smoothly.

A lever 12 is arranged at the front of the front plate 8 to open and close the pair of shutter blades 2 and 4. The lever 12 is pivotally mounted, at a portion adjacent to its lower end, on a pin 8b which is forwardly projects from the front plate 8. The lever 12 has an upper end including a pair of projections 12a and 12b which extend, respectively, backwardly to penetrate the corresponding recesses 8c and 8d and to engage with the corresponding oval holes formed in the shutter blades 2 and 4. The tips of the projections are loosely inserted in a recess 6d and a opening 6e of the support plate 6. The distance between the pin 8b and the upper end of the lever 12 is quite larger than the distance between the pin 8b and the lower end of the lever 12. When the lever 12 is pivoted in one direction $X_1$, the shutter blades 2 and 4 rotates in the opposite directions $Y_1$ and $Y_2$ with respect to the pin 8a to open the exposure-openings 8d, 7c and 6a of the respective members 8, 7 and 6. When the lever 12 is pivoted in the opposite direction $X_2$, the shutter blades rotates to close the exposure-openings. Even if the distance of the movement of the lower end of the lever 12 is very slight, the upper end of the lever 12, accordingly the projections 12a and 12b, can move widely so as to open the shutter blades 2 and 4.

Needless to say, the shutter-opening detecting holes 2A–2G are arranged in the shutter blade 2 along a circular arc around the pin 8a. When the hole 2A moves to correspond to the hole 7a of the intermediate plate 7, a pin-hole is defined by the recesses 2a and 4a of the shutter blades; this means the initial stage of the opening of the shutter blades. When the hole 2B moves to correspond to the hole 7a, the minimum aperture for exposure is defined by the recesses 2a and 4a. On the contrary, when the hole 2G moves to correspond to the hole 7a, the maximum aperture for exposure is defined by the recesses 2a and 4a. It is to be noted that the number and position of the shutter-opening detecting holes may be set based on the desired aperture values.

The lever 12 has a lower end to which a U-shaped member 12e is secured. The U-shaped member 12e is provided with a pair of pins 12c and 12d which nip the lower end of the main piezoelectric element 14. The upper end of the piezoelectric element 14 is supported by a holder 30 which is secured to the support plate 6.

An auxiliary piezoelectric element 15 is arranged in parallel and spaced relation to the main piezoelectric element 14. The upper end of the auxiliary driving element 14 is also supported by the holder 30. The driving element 15 has a lower end provided with an insulated spacer 15a which projects to contact the main piezoelectric element 15 to maintain a predetermined distance between the both elements 14 and 15.

With the construction as described above, the basic operation of the shutter apparatus is as follows;

Referring to FIG. 1, the electric voltage is applied to the main piezoelectric element 14, the free end, i.e. the lower end, of the element 14 is curved or moved in a clockwise direction to rotate the lever 12 in one direction $X_1$ (the operation of the auxiliary piezoelectric element 15 will be described later). Then, the pair of shutter blades 2 and 4 are respectively rotated in the opposite directions $Y_1$ and $Y_2$ around the pin 8a. When the shutter blades 2 and 4 are rotated, the shutter-opening detecting holes 2A–2G pass, in turn, the photoelectric sensor 10 so that the light receiving element 10b of the photoelectric sensor 10 receives the light having passed through the respective holes 2A–2G, hole 7a and recess 6b to produce, in turn, the detection signals or pulses representing the amount of opening by the shutter blades 2 and 4. When the predetermined number of pulses are counted in a control circuit, which will be described in detail later, it is detected that the predetermined amount of shutter opening has been obtained and the supply of the electric voltage to the main piezoelectric element 14 is discontinued to return the shutter blades to their initial positions.

Figure 5A:
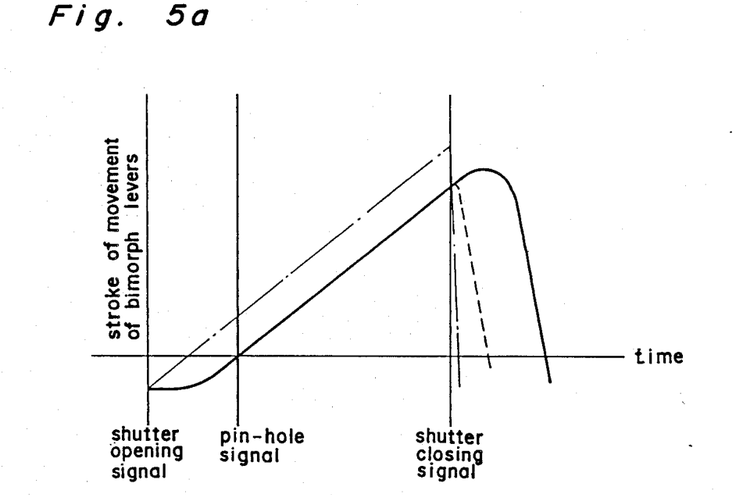
FIGS. 5a, 5b and 5c are graphs showing the desired voltage-movement characteristics of piezoelectric driving means, respectively.
Figure 5B:
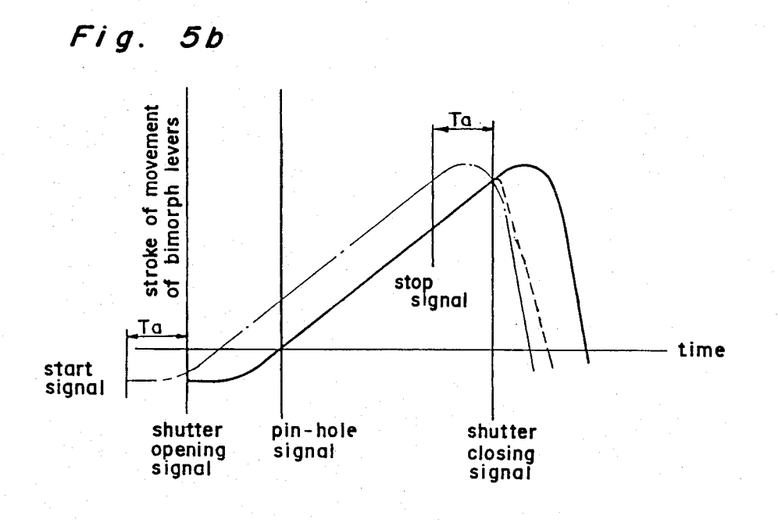
Figure 5C:
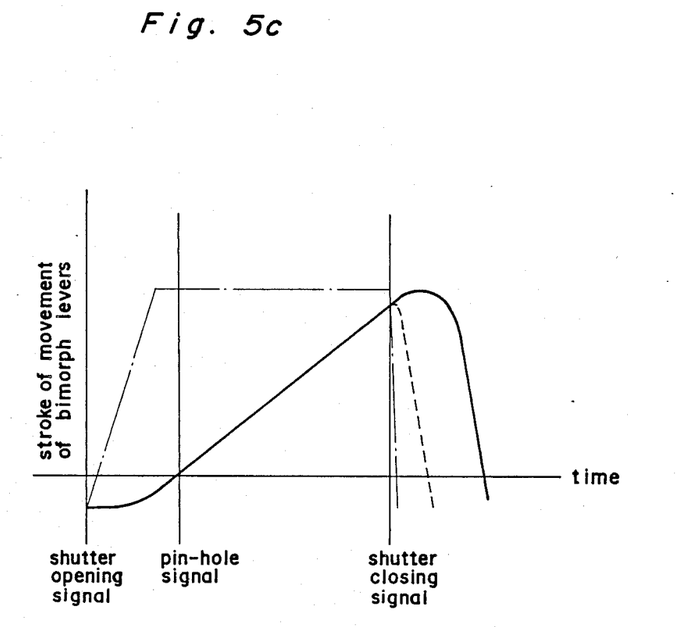

There may be provided three types operations as to the auxiliary piezoelectric element 15 which are respectively shown in FIGS. 5a, 5b and 5c, wherein the abscissa axis represents the time, while the ordinate axis represents the stroke or amount of curve or movement of the piezoelectric elements 14 and 15, the solid line represents the movement of the main piezoelectric element 14, the chain line represents the movement of the auxiliary piezoelectric element 15 and the broken line represents the composition of said both lines.

Referring first to FIG. 5a, which shows a first operation, the electric voltage is applied to both piezoelectric elements 14 and 15, simultaneously, responding to the shutter opening signal. The free ends of both piezoelectric elements shifts in the clockwise direction in FIG. 1. As apparent from FIG. 5a, since the main element 14 drives the inertial system, i.e. the lever 12 and the shutter blades 2 and 4, the standing up of the solid line representing the movement of the main piezoelectric element 14 is delayed as compared with that of the chain line representing the movement of the auxiliary piezoelectric element 15. Accordingly, the free end of the auxiliary piezoelectric element 15 or the spacer 15a, which has been in contact with the side surface of the main piezoelectric element 14, separates from the element 14. Thus, the auxiliary element 15 never interfere with the movement of the main element 14.

Subsequently, when shutter closing signal is generated, the supply of electric voltage to the piezoelectric elements 14 and 15 is discontinued. However, the clockwise movement of the main element 14 can not stop momentarily due to the inertia of the lever 12 and shutter blades 2 and 4 so that the solid line rises furthermore in a moment, as shown in FIG. 5a. Meanwhile, the auxiliary element 15 starts momentarily returning to its initial position in response to the shutter closing signal to urge the main element 14 in the counterclockwise direction. Accordingly, the movement of the main element 14 is represented by the broken line indicating the composition of the solid line and the chain line, that is, the closing speed of the shutter blade can be improved. It is to be noted that the returning movement of the main element 14 may scatter in shutter closing characteristic under the influence of the friction between the members such as the main element 14, shutter blades 2 and 4 and lever 12, while the auxiliary element 15 is not influenced by such friction. According to the above embodiment, the auxiliary element 15, which urges the main element 14, can improve the scatter in shutter closing characteristic of the main element 15.

Next, FIG. 5b shows a second operation of the piezoelectric elements 14 and 15. It is supposed in the second operation that the piezoelectric elements 14 and 15 are the same in a respect of the opening and closing characteristic. In this case, as shown in FIG. 5b, the start signal to the auxiliary element 15 is produced prior of the production of the shutter opening signal to the main element 14 by a time period Ta so that the movement of the auxiliary element 15 precedes that of the main element 14. Regarding the closing of the elements 14 and 15, supply of the electric voltage to the auxiliary element 15 is discontinued a time period Ta before the production of the shutter closing signal for discontinuing supply of the electric voltage to the main element 14. In this operation, the closing characteristic of the main element 14 is also improved as apparent from the broken line representing the composition of the solid line and the chain line.

In the respective operations as described above both piezoelectric elements 14 and 15 have substantially the same Voltage-movement characteristic. Accordingly, in order to avoid the interference between both elements, high reliability concerning said characteristic is required. According to the third operation as shown in FIG. 5c, even if said reliability is relatively low, the interference between both elements 14 and 15 can be easily avoided and the closing characteristic of the main element 14 can be improved.

Referring to FIG. 5c, the shutter opening signal is supplied to both elements 14 and 15, simultaneously, as similar to the case of FIG. 5a. It is to be noted that in the third operation the time-movement characteristic of the elements 14 and 15 is quite different from each other. That is, the standing up of the chain line representing the movement of the auxiliary element 15 is very rapid as compared with that of the main element 14. Therefore, possible interference between both element 14 and 15 is insured to be avoided. The closing operation of both elements 14 and 15 are substantially the same as the case of FIG. 5a.

Figures 6A, 6B:
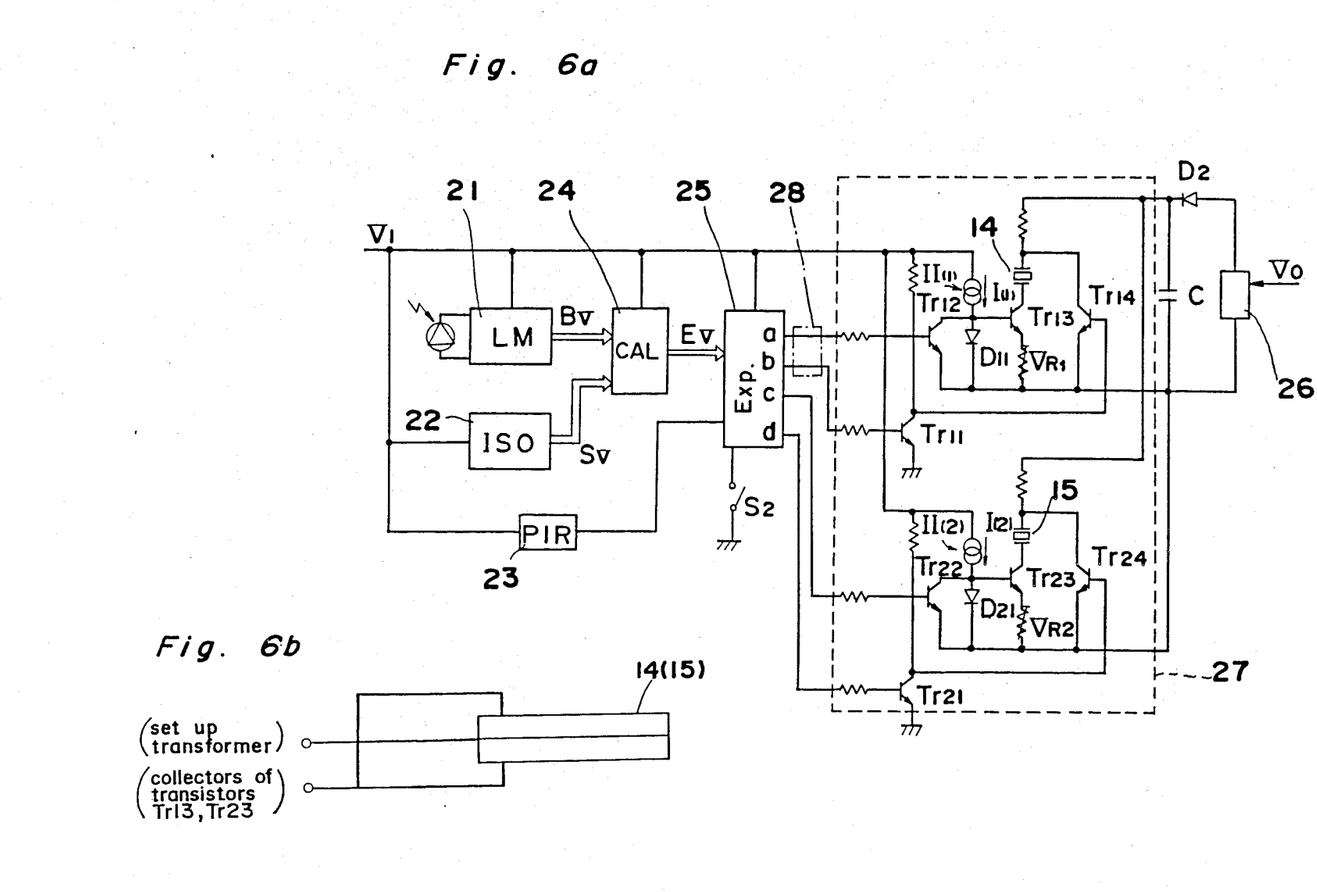
FIG. 6a is a diagram showing a control circuit for controlling the shutter apparatus.
FIG. 6b is a diagram showing a circuit for electric connection to the piezoelectric driving means.

FIG. 6a shows the control circuit for controlling shutter apparatus. The control circuit comprises a piezoelectric element charging circuit 27 which is indicated by a broken line. The circuit 27 includes main and auxiliary piezoelectric elements 14 and 15 which are respectively incorporated in collector circuit of the corresponding transistors Tr13 and Tr23. The respective transistors have such a amplification characteristic that the collector current is constant regardless of the collector voltage provided that the base voltage, i.e. potential between the base and emitter, is constant, so that the elements 14 and 15 are charged under constant electric current.

Reference numeral 21 designates a light metering circuit for metering the brightness of an object to be photographed, reference numeral 22 a film-sensitivity reading circuit for reading film-sensitivity, reference numeral 23 a shutter blade position detecting circuit including the photoelectric sensor 10 as described above. An exposure value Ev is obtained in a calculation circuit 24 by using the brightness value Bv and film-sensitivity value Sv (speed value) and output into an exposure control circuit 25. When a switch S2 is turned on by a shutter release operation, charge signal are supplied from the exposure control circuit 25 to the piezoelectric element charging circuit 27 to charge both piezoelectric elements 14 and 15. When the exposure control circuit 25 receives desired number of pulse signals corresponding the desired exposure value Ev, the output of the charge signal is discontinued, while discharge signal is output to the circuit 27. The circuit 27 has such a function as to enable charging the both piezoelectric elements 14 and 15 under a constant current, on one hand, and to enable discharging it momentarily, on the other hand. A stepup transformer 26 is provided for the purpose of boosting the source voltage up to the maximum voltage necessary to charge the piezoelectric elements. This stepup transformer 26 is the same as employed for the electronic flash circuit. In addition, referring to FIG. 6b, regarding either main element 14 and auxiliary element 15, their center electrodes are respectively connected to the stepup transformer 26, while the pair of side electrodes thereof are respectively connected to the collectors of the corresponding transistors Tr13 and Tr23. These piezoelectric elements 14 and 15 are mounted on the holder 30 so that when positive voltage is applied to the elements, their free ends are respectively curved or moved in the clockwise direction in FIG. 1.

Furthermore, in FIG. 6a, reference numeral 28 designates a delay circuit which is employed only for said second operation as shown in FIG. 5b. Namely, the delay time period Ta is accomplished by this delay circuit 28.

Figure 6C:
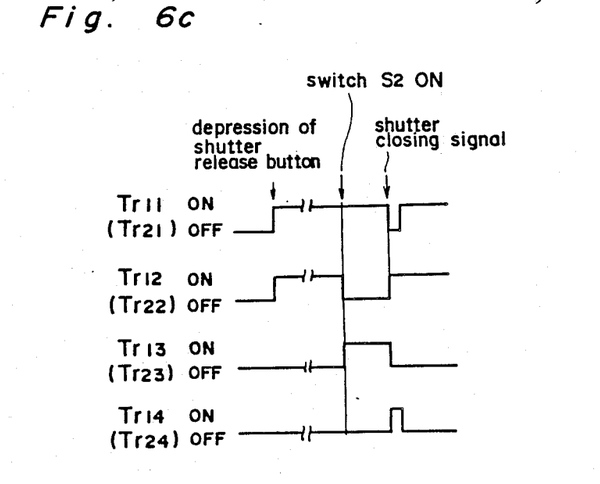

The operations of the control circuit are as follows;

First, the cases as shown in FIGS. 5a and 5b will be described by making reference to FIGS. 6a and 6c. When a main switch (not shown) is turned on, the stepup transformer 26 is loaded, as indicated by a symbol Vo, so that a main capacitor C is charged up to a predetermined voltage. Subsequently, when the shutter release button is depressed, a predetermined switch (not shown) is turned on to load the circuits except the stepup transformer 26, as indicated by a symbol V1. Accordingly, the light metering circuit 21 is operated to output the brightness value Bv of the object into the calculation circuit 24. The film-sensitivity is automatically read from DX code on the film cartridge or container by the film-sensitivity reading circuit 22 which outputs the film-sensitivity value Sv into the calculation circuit 24. Exposure value Ev is obtained through the calculation in the circuit 24 and output into the exposure control circuit 25. In this stage, the output terminals a, b; c, d are producing high level signals, respectively, so that, as shown in FIG. 6c, the transistors Tr11,Tr21; Tr12, Tr22 are enabled respectively, then the transistors Tr13, Tr23; Tr14, Tr24 for driving and initializing the piezoelectric elements 14 and 15 are disabled respectively, causing the charge in the piezoelectric elements 14, 15 to be 0.

Subsequently, when the shutter release button is further depressed deeply, the release switch S2 is turned on so that low level signals are output from the output terminals a, c, while the output terminals b, d continue outputting high level signals. Accordingly, the transistors Tr12, Tr22 are respectively disabled, while the transistors Tr13, Tr23 are respectively enabled. It is to be noted that respective diodes D11, D21 are incorporated in a line between the bases and emitters of the corresponding transistors Tr13, Tr23 and constant electric current I(1), I(2) is supplied to the respective diodes D11, D21 through the constant current sources II(1), II(2). Accordingly, the voltage between the bases and emitters of the transistors Tr13, Tr23 is maintained constant so that the collector current I(1), I(2) thereof is insured to be constant. In addition, reference symbols VR1, VR2 designate, respectively, variable resistors. It is to be noted that if the piezoelectric elements 14 and 15 are charged under the constant current I(1), I(2), the auxiliary element 15 is curved in proportion to the charged voltage, on one hand, and the main element 14 gains the driving force in proportion to the charged voltage. The shutter blades 2 and 4 are moved to open an aperture by the driving force generated on the main element 14 through the lever 12. In this case, pulse signals are generated in the photoelectric sensor 10 according to the rotative amount of the shutter blades and supplied into the exposure control circuit 25. When the exposure control circuit 25 receives the desired number of pulse signals corresponding to the calculated exposure value Ev, high level signals are supplied from the output terminals a, c, while low level signals are supplied from the output terminals b, d so that the transistors Tr12, Tr22 are enabled, while the transistors Tr13, Tr23 are disabled, resulting in that the movement of the main and auxiliary elements 14, 15 are discontinued, and simultaneously the transistors Tr11, Tr21 for controlling the closing operation of the shutter blades are enabled so that the transistors Tr14, Tr24 are enabled in a momentary time period, causing the short circuit of respective piezoelectric elements 14 and 15. Thus, the piezoelectric elements 14, 15 start returning to the initial positions to close the aperture by the shutter blades.

Figure 6D:
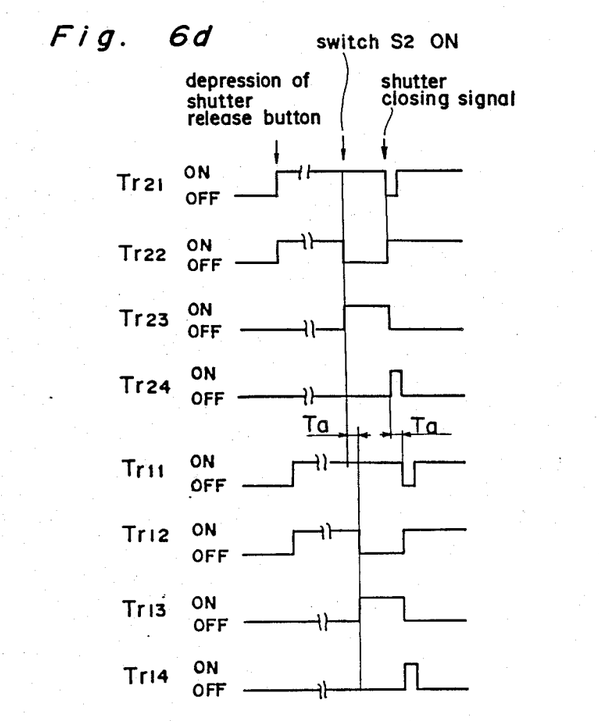

Next, the case of FIG. 5b will be described below by making reference to FIG. 6d. The basic operation of this case is the same as that of FIGS. 5a and 5c and the different operation is as follows;

As previously described, the delay circuit 28 is employed in this case. The delay circuit 28 is incorporated in the lines connecting the main element controlling output terminals a, b to the piezoelectric element charging circuit 27. Accordingly, even if the control signals are simultaneously output from the terminals a, b, c and d, the control signals from the terminals a, c are supplied to the bases of the transistors Tr11, Tr12 with delayed by a time period Ta so that such an operation as shown in FIG. 6d can be accomplished.

Figure 7A:
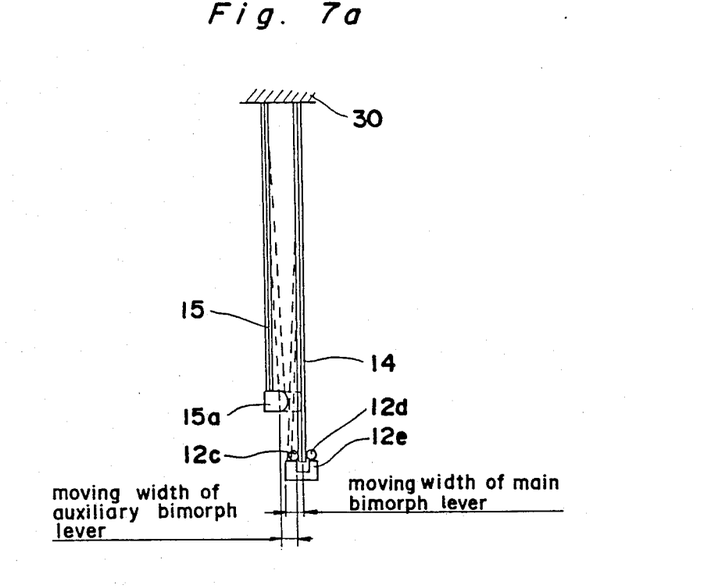
FIG. 7a is a front view showing a second embodiment of the present invention in which the piezoelectric elements are mounted on their holder.

FIGS. 7a, 7b, 7c and 7d show another embodiment of the present invention. This embodiment is different from the first embodiment in respect of the arrangement of the piezoelectric elements 14 and 15 and their operation. Referring to FIG. 7a, the main and auxiliary piezoelectric elements 14 and 15 are secured to the holder 30 in substantially the same manner as that of the first embodiment. However, the spacer 15a of the auxiliary element 15 is in spaced relation to the main element 14 at the initial state as shown by solid lines. The broken lines illustrate the positions of fully moved elements 14 and 15. Furthermore, the main element 14 is mounted on the holder 30 so that the free end thereof can be curved in the clockwise direction, while the auxiliary element 15 is mounted on the holder 30 so that the free end thereof can be curved in the counterclockwise direction.

The control circuit to be adapted to the above second embodiment is the same as that of the first embodiment, i.e. the control circuit shown in FIG. 6a. It is to be noted that the delay circuit 28 is not necessary in the second embodiment. In this embodiment, the program applied to the exposure control circuit 25 is designed so as to effect the operation as shown in FIG. 7b.

Figure 7B:
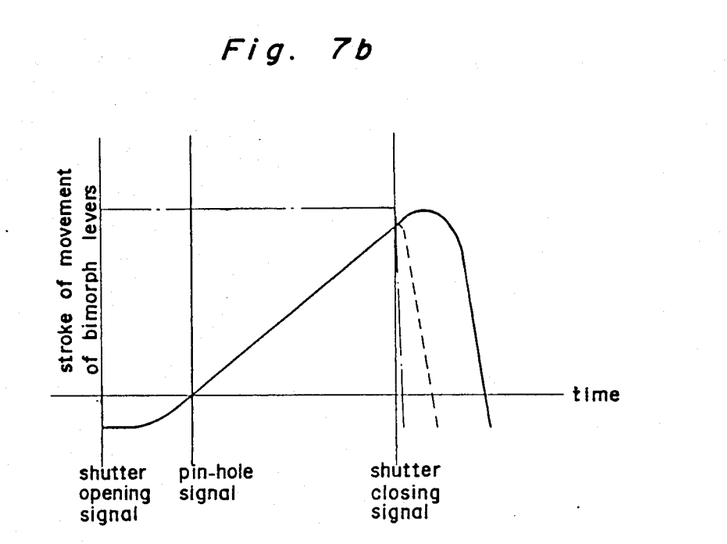
FIG. 7b is a graph showing a voltage-movement of the piezoelectric elements according to the second embodiment.

Referring to FIG. 7b, it is to be noted that electric voltage is supplied to the auxiliary element 15 only when shutter closing signal is produced, so that the auxiliary element 15 urges the main element 14 toward its initial position to achieve more rapid return of the main element 14.

Figure 7C:
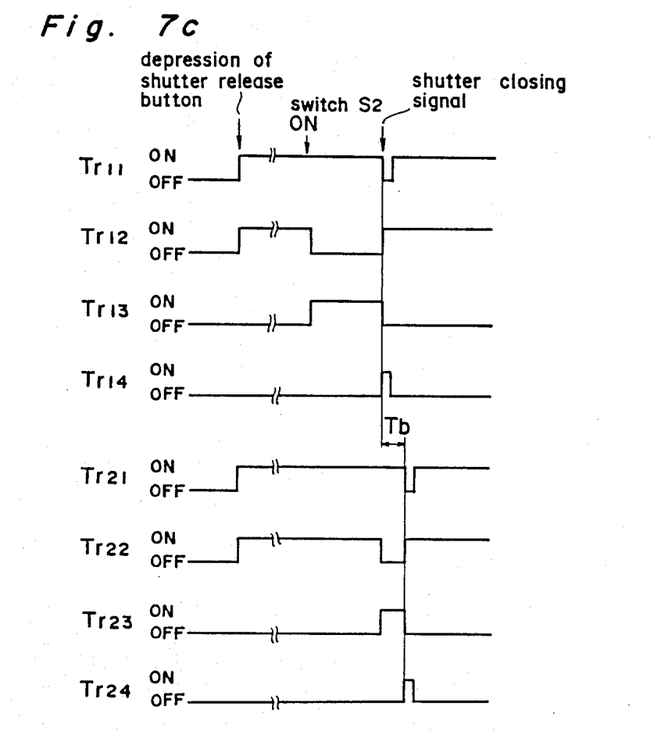
FIG. 7c is a time chart showing an operation of the control circuit according to the second embodiment.

The operation of the second embodiment will be described below by making reference to FIGS. 6a and 7c.

When a main switch (not shown) is turned on, the stepup transformer 26 is loaded, as indicated by a symbol Vo, so that a main capacitor C is charged up to a predetermined voltage. Subsequently, when the shutter release button is depressed, a predetermined switch (not shown) is turned on to load the circuits except the stepup transformer 26, as indicated by a symbol V1. Accordingly, the light metering circuit 21 is operated to output the brightness value Bv of the object into the calculation circuit 24. The film-sensitivity is automatically read from DX code on the film cartridge or container by the film-sensitivity reading circuit 22 which outputs the film-sensitivity value Sv into the calculation circuit 24. Exposure value Ev is obtained through the calculation in the circuit 24 and output into the exposure control circuit 25. In this stage, the output terminals a, b, c, d are producing high level signals, respectively, so that, as shown in FIG. 7c, the transistors Tr11,Tr21, Tr12, Tr22 are enabled, respectively, then the transistors Tr13, Tr23, Tr14, Tr24 are disabled, respectively, causing the charge in the piezoelectric elements 14, 15 to be 0.

Subsequently, when the shutter release button is further depressed deeply, the release switch S2 is enabled so that low level signal is output from the output terminal a, while the output terminals b, c, d continue outputting high level signals. Accordingly, the transistor Tr12 is disabled, while the transistor Tr13 is enabled. The voltage between the base and emitter of the transistor Tr13 is maintained constant so that the collector current I(1) is insured to be constant. It is to be noted that if the main piezoelectric element 14 is charged under the constant current I(1), the main element 14 gains the driving force in proportion to the charged voltage. The shutter blades 2 and 4 are rotated to open an aperture by the driving force generated on the main element 14 through the lever 12. In this case, pulse signals are generated in the photoelectric sensor 10 according to the moving amount of the shutter blades and supplied into the exposure control circuit 25. When the exposure control circuit 25 receives the desired number of pulse signals corresponding to the calculated exposure value Ev, high level signal is supplied from the output terminal a and low level signals are supplied from the output terminals b, c, while the output terminal d continue outputting high level signal so that the transistor Tr12 is enabled, while the transistors Tr13 is disabled, causing that the movement of the main element 14 is discontinued, and simultaneously the transistor Tr11 for controlling the closing operation of the shutter blades is disabled so that the transistor Tr14 is enabled in a momentary time period, causing the short circuit of main element 14. Thus, the piezoelectric element 14 starts returning to the initial position to close the shutter blades. Simultaneously with the above, the transistor Tr22 is disabled, while the transistor Tr23 is disabled. The voltage between base and emitter is maintained constant, resulting in constancy of the collector current in the transistor Tr23. In this embodiment, the variable resistor VR2 is adjusted so that collector current of the transistor 23 is insured to be extremely larger than that of the transistor Tr 13, resulting in that the movement of the auxiliary element 15 is extremely faster than that of the main element 14. When it passed a predetermined time period Tb after the input of the shutter closing signal, high level signal is output from the output terminal c, while low level signal is output from the output terminal d, so that the transistor Tr22 is enabled, while the transistor 23 is disabled, whereby the movement of the main element 14 is discontinued, and simultaneously the transistor Tr 24 for controlling the shutter closing is disabled, resulting in that the transistor Tr 24 is enabled in a momentary time period to effect the short-circuit of the auxiliary element 15. Thus, the auxiliary element 15 starts returning to the initial position.

According to the second embodiment as described above, the main element 14 can be returned very rapidly to its initial position with the aid of the positive driving force of the auxiliary element 15 to which electric voltage is applied when the shutter closing signal is generated. Thus, high speed shutter apparatus can be obtained as compared with that according to the first embodiment. However, it is to be noted that the first embodiment has such an advantage that since the both piezoelectric elements 14 and 15 are in contact with each other always, that is, since the main element 14 is supported by the auxiliary element 15, even if some mechanical shock is accidentally applied to a camera, the main element 14, accordingly the shutter blade 2 and 4, is not easy to be moved. Thus, the aperture is not opened, accidentally.

Figure 1A:
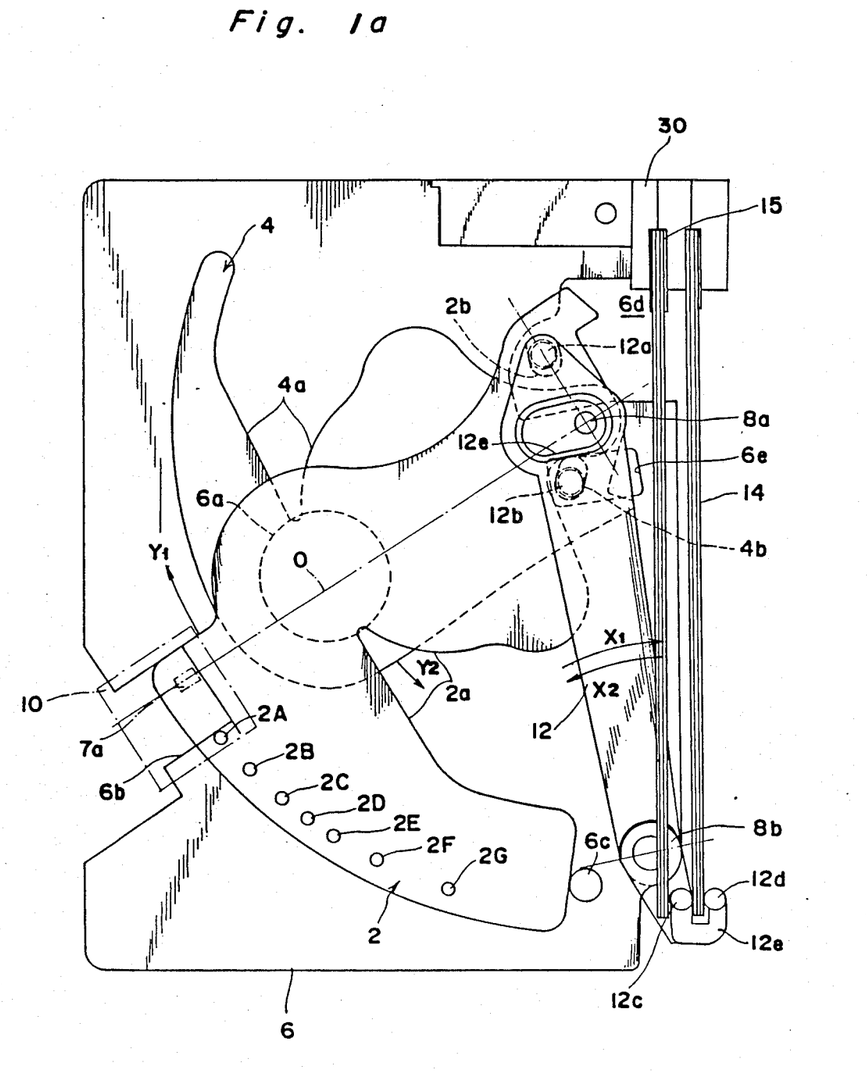
FIG. 1a is a front view showing an essential part of the shutter apparatus according a modification of the present invention.

In addition, referring to FIG. 1a, the free end of the auxiliary piezoelectric element 15 may extend so as to contact the pin 12c. In this case, the driving force of the element 15 is transmitted to the main element 14 by means of the U-shaped member 12e.

Although the present invention has been fully described by way of example with reference to the accompanying drawings, it is to be noted, here, that various changes and modifications will be apparent to those skilled in the art. Therefore, unless otherwise such changes and modifications depart from the scope of the present invention, they should be construed as included therein.

What is claimed is:

1. A shutter apparatus for camera, comprising;
    a main piezoelectric driving means having an operating portion which is able to move between a closed position and an opening position to drive a shutter blade so as to be opened and closed, and
    an auxiliary piezoelectric driving means having an operating portion for urging the shutter blade toward its closed position when the operating portion of said main driving means returns from the opening position to the closed position.

2. A shutter apparatus as claimed in claim 1, wherein said main and auxiliary driving means are plate-shaped, respectively.

3. A shutter apparatus as claimed in claim 2, further comprising;
    a transmitting means for transmitting driving force of said main driving means to said shutter blade.

4. A shutter apparatus as claimed in claim 3, wherein the operating portion of said auxiliary driving means takes an initial position which is within a range of movement of the operating portion of said main driving means.

5. A shutter apparatus as claimed in claim 4, further comprising;
    a control means which controls said both driving means such that when the shutter blade is to be opened, the operating portion of said auxiliary driving means moves toward said opening position ahead of movement of said main driving means, while when the shutter blade is to be closed, the operating portion of said auxiliary driving means urges the operating portion of said main driving means toward said closed position.

6. A shutter apparatus as claimed in claim 5, wherein said control means control said both driving means such that when said shutter blade is to be opened, the operating portions of said both driving means start moving toward said opening position substantially simultaneously.

7. A shutter apparatus as claimed in claim 6, wherein said control means control said both driving means such that moving speed of the operating portion of said auxiliary driving means is higher than that of the operating portion of said main driving means.

8. A shutter apparatus as claimed in claim 5, wherein said control means controls said both driving means such that when said shutter blade is to be opened, the operating portion of said auxiliary driving means starts moving before the fee end of said main driving means starts moving.

9. A shutter apparatus as claimed in claim 4, wherein said both driving means are so arranged that when said both driving means are respectively located at the closed position, the operating portion of said auxiliary driving means substantially contacts the operating portion of said main driving means.

10. A shutter apparatus as claimed in claim 3, further comprising;
   a control means which controls said auxiliary driving means such that when said shutter blade is to be closed, the operating portion of said auxiliary driving means urges the operating portion of said main driving means toward said closed position.

11. A shutter apparatus as claimed in claim 4, wherein each of said driving means has a fixed end. which is fixed to a support member.

12. A shutter apparatus as claimed in claim 1, wherein an initial position of the operating portion of said auxiliary driving means is remote from an initial position of the operating portion of said main driving means and a range of movement of the operating portion portion of said auxiliary driving means overlaps with that of the operating portion of said main driving means.

13. A shutter apparatus as claimed in claim 12, wherein further comprising;
   a control means which controls said auxiliary driving means such that when said shutter blade is to be closed, the operating portion of said auxiliary driving means urges the operating portion of said main driving means toward said closed position.

14. A shutter apparatus as claimed in claim 1, further comprising;
   a transmitting means for transmitting driving force of said main driving means to said shutter blade.

15. A shutter apparatus as claimed in claim 14, wherein the operating portion of said auxiliary driving means is arranged so as to substantially contact said transmitting means in a range of movement of said transmitting means.

16. A shutter apparatus as claimed in claim 15, further comprising;
   a control means which controls said both driving means such that when the shutter blade is to be opened, the operating portion of said auxiliary driving means moves in the same direction as that of movement of said transmitting means ahead of movement of said main driving means, while when the shutter blade is to be closed, the operating portion of said auxiliary driving means urges the transmitting means toward said closed position.

17. A shutter apparatus as claimed in claim 14, wherein an initial position of the operating portion of said auxiliary driving means is remote from said transmitting means and a range of movement of said auxiliary driving means overlaps with that of said transmitting means.

18. A shutter apparatus as claimed in claim 17, wherein further comprising;
   a control means which controls said auxiliary driving means such that when said shutter blade is to be closed, the operating portion of said auxiliary driving means urges said transmitting means toward said closed position.

* * * * *